(12) United States Patent
Hjörlund et al.

(10) Patent No.: US 12,184,985 B2
(45) Date of Patent: Dec. 31, 2024

(54) CONTROL METHOD, PHOTOGRAPHING APPARATUS, LENS, MOVABLE PLATFORM, AND COMPUTER READABLE MEDIUM

(71) Applicant: VICTOR HASSELBLAD AB, Götenborg (SE)

(72) Inventors: Bjarne Hjörlund, Shenzhen (CN); Qingyu Lu, Shenzhen (CN); Shuai Zou, Shenzhen (CN)

(73) Assignee: VICTOR HASSELBLAD AB, Gothenburg (SE)

( * ) Notice: Subject to any disclaimer, the term of this patent is extended or adjusted under 35 U.S.C. 154(b) by 224 days.

(21) Appl. No.: 17/843,954

(22) Filed: Jun. 17, 2022

(65) Prior Publication Data
US 2022/0321757 A1    Oct. 6, 2022

Related U.S. Application Data

(63) Continuation of application No. PCT/EP2019/086262, filed on Dec. 19, 2019.

(51) Int. Cl.
| | |
|---|---|
| H04N 23/72 | (2023.01) |
| B64D 47/08 | (2006.01) |
| G03B 9/70 | (2021.01) |
| G03B 15/05 | (2021.01) |
| H04N 23/54 | (2023.01) |
| H04N 23/55 | (2023.01) |

(Continued)

(52) U.S. Cl.
CPC .............. *H04N 23/72* (2023.01); *G03B 9/70* (2013.01); *G03B 15/05* (2013.01); *H04N 23/66* (2023.01); *H04N 23/667* (2023.01); *H04N 23/73* (2023.01)

(58) Field of Classification Search
None
See application file for complete search history.

(56) References Cited

U.S. PATENT DOCUMENTS

| | | | | |
|---|---|---|---|---|
| 4,523,827 A | * | 6/1985 | Masunaga | ............... G02B 7/30 |
| | | | | 396/264 |
| 5,848,306 A | | 12/1998 | Shono | |

(Continued)

FOREIGN PATENT DOCUMENTS

| | | |
|---|---|---|
| CN | 106791453 A | 5/2017 |
| EP | 2302901 A2 | 3/2011 |
| WO | 2007065964 A1 | 6/2007 |

OTHER PUBLICATIONS

The World Intellectual Property Organization (WIPO) International Search Report for PCT/EP2019/086262 Aug. 5, 2020 4 Pages.

*Primary Examiner* — Hung Q Dang
(74) *Attorney, Agent, or Firm* — ANOVA LAW GROUP, PLLC

(57) ABSTRACT

A control method applied to a photographing apparatus that includes a lens, an external device, and a body communicatively connected to the lens and the external device. The control method includes the body sending a shutter opening command to the lens; the lens sending a trigger signal to the body according to the shutter opening command, the trigger signal including a first pulse and a second pulse; and the body receiving the trigger signal sent from the lens, triggering a resetting operation of an image sensor inside the body according to the first pulse and triggering activation of the external device according to the second pulse.

20 Claims, 10 Drawing Sheets

(51) Int. Cl.
    *H04N 23/57*         (2023.01)
    *H04N 23/66*         (2023.01)
    *H04N 23/667*       (2023.01)
    *H04N 23/73*         (2023.01)

(56) References Cited

U.S. PATENT DOCUMENTS

| | | | |
|---|---|---|---|
| 7,187,858 B2* | 3/2007 | Dowe | G03B 7/26 |
| | | | 396/303 |
| 10,264,167 B2 | 4/2019 | Shintani | |
| 2003/0048412 A1* | 3/2003 | Van Houten | A61B 3/14 |
| | | | 351/206 |
| 2004/0071458 A1* | 4/2004 | Motomura | G03B 15/05 |
| | | | 396/159 |
| 2004/0081446 A1 | 4/2004 | Compton | |
| 2006/0161691 A1* | 7/2006 | Katibian | G03B 17/00 |
| | | | 710/5 |
| 2007/0098385 A1* | 5/2007 | Tanaka | H04N 23/663 |
| | | | 348/E5.044 |
| 2008/0291317 A1 | 11/2008 | Endo et al. | |
| 2009/0060488 A1* | 3/2009 | Okubo | G03B 15/03 |
| | | | 396/180 |
| 2011/0129207 A1* | 6/2011 | King | H04N 23/66 |
| | | | 396/56 |
| 2011/0317991 A1 | 12/2011 | Tsai | |
| 2018/0048795 A1* | 2/2018 | Shintani | H04N 23/671 |
| 2018/0359411 A1* | 12/2018 | Kohstall | H04N 23/60 |
| 2019/0324478 A1 | 10/2019 | Lin et al. | |
| 2019/0349505 A1 | 11/2019 | Tsuchiya | |

* cited by examiner

CONTROL METHOD, PHOTOGRAPHING APPARATUS, LENS, MOVABLE PLATFORM, AND COMPUTER READABLE MEDIUM

CROSS-REFERENCE TO RELATED APPLICATION

This application is a continuation of International Application No. PCT/EP2019/086262, filed Dec. 19, 2019, the entire content of which is incorporated herein by reference.

TECHNICAL FIELD

The present application relates to the technical field of photography, and in particular to a control method, a photographing apparatus, a movable platform, and a computer readable medium.

BACKGROUND ART

Cameras typically comprise a lens and an external device (e.g., a flash). During photographing, it is necessary in the cameras to control the starting time point of the effective exposure and the time point at which the flash is fired. Usually, the two time points are completely synchronized, that is, the flash is fired for fill lighting at the same time as the exposure starts. However, this fully synchronized exposure and fill lighting method may not meet special requirements of photographing effects.

SUMMARY

Embodiments of the present application provide a control method, a photographing apparatus, a movable platform, and a computer-readable medium, which are intended to solve the problem that a camera cannot meet special requirements of photographing effects.

In a first aspect, an embodiment of the present application provides a control method applied to a photographing apparatus comprising a lens, an external device and a body, the body being communicatively connected to the lens and the external device, respectively, the method comprising:

the body sending a shutter opening command to the lens;

the lens sending a trigger signal to the body according to the shutter opening command, the trigger signal comprising a first pulse and a second pulse; and the body receiving the trigger signal sent from the lens, triggering a resetting operation of an image sensor inside the body according to the first pulse and triggering the activation of the external device according to the second pulse.

In a second aspect, an embodiment of the present application provides a control method applied to a lens, the lens being communicatively connected to a body of a photographing apparatus, the photographing apparatus further comprising an external device, the method comprising:

the lens receiving a shutter opening command sent from the body; and the lens sending a trigger signal to the body according to the shutter opening command, the trigger signal comprising a first pulse and a second pulse, such that the body triggers a resetting operation of an image sensor inside the body according to the first pulse, and triggers the activation of the external device according to the second pulse.

In a third aspect, an embodiment of the present application provides a control method applied to a photographing apparatus comprising a body, the body being communicatively connected to an external device and a lens, respectively, the method comprising:

the body sending a shutter opening command to the lens;

the body receiving a trigger signal sent from the lens, the trigger signal comprising a first pulse and a second pulse; and the body triggering a resetting operation of an image sensor inside the body according to the first pulse and triggering the activation of the external device according to the second pulse.

In a fourth aspect, an embodiment of the present application provides a photographing apparatus comprising a lens, an external device and a body, the body being communicatively connected to the lens and the external device, respectively, wherein the body is configured for sending a shutter opening command to the lens;

the lens is configured for sending a trigger signal to the body according to the shutter opening command, the trigger signal comprising a first pulse and a second pulse; and the body is further configured for receiving the trigger signal sent from the lens, triggering a resetting operation of an image sensor inside the body according to the first pulse and triggering the activation of the external device according to the second pulse.

In a fifth aspect, an embodiment of the present application provides a lens, the lens being communicatively connected to a body of a photographing apparatus, the photographing apparatus further comprising an external device, wherein the lens is configured for:

receiving a shutter opening command sent from the body; and sending a trigger signal to the body according to the shutter opening command, the trigger signal comprising a first pulse and a second pulse, such that the body triggers a resetting operation of an image sensor inside the body according to the first pulse, and triggers the activation of the external device according to the second pulse.

In a sixth aspect, an embodiment of the present application provides a photographing apparatus comprising a body, the body being communicatively connected to an external device and a lens, respectively, wherein the body is configured for:

sending a shutter opening command to the lens;

receiving a trigger signal sent from the lens, the trigger signal comprising a first pulse and a second pulse; and triggering a resetting operation of an image sensor inside the body according to the first pulse and triggering the activation of the external device according to the second pulse.

In a seventh aspect, an embodiment of the present application provides a movable platform, comprising: a movable platform body and a photographing apparatus according to the fourth aspect, wherein the photographing apparatus is mounted on the movable platform body.

In an eighth aspect, an embodiment of the present application provides a movable platform, comprising: a movable platform body and a lens according to the fifth aspect, wherein the lens is mounted on the movable platform body.

In a ninth aspect, an embodiment of the present application provides a movable platform, comprising: a movable platform body and a photographing apparatus according to the fifth aspect, wherein the photographing apparatus is mounted on the movable platform body.

In a tenth aspect, an embodiment of the present application provides a readable storage medium, wherein a computer program is stored on the readable storage medium; and the control method according to the first aspect is implemented when the computer program is executed.

In an eleventh aspect, an embodiment of the present application provides a readable storage medium, wherein a computer program is stored on the readable storage medium; and the control method according to the second aspect is implemented when the computer program is executed.

In a twelfth aspect, an embodiment of the present application provides a readable storage medium, wherein a computer program is stored on the readable storage medium; and the control method according to the third aspect is implemented when the computer program is executed.

According to the control method, photographing apparatus, movable platform, and computer-readable media provided in the embodiments of the present application, the body sends a shutter opening command to the lens, the lens then sends, according to the shutter opening command, a trigger signal comprising the first pulse and the second pulse to the body, and the body, after receiving the trigger signal, triggers the resetting operation of the image sensor according to the first pulse and triggers the activation of the external device according to the second pulse. In the technical solutions provided in the present application, two pulse signals are used to control the resetting of the image sensor and the activation of the external device, so that the resetting time point of the image sensor and the activation time point of the external device are independent of each other, and thus the two time points can be set separately. As the setting of the two time points varies, different photographing effects can be obtained, or more diverse photographing requirements can be met.

BRIEF DESCRIPTION OF THE DRAWINGS

In order to illustrate the technical solutions of the embodiments of the present application more clearly, a brief introduction to the drawings to be used in describing the embodiments will be provided below. Obviously, the drawings in the following description show some of the embodiments of the present application, and those of ordinary skilled in the art would derive other drawings from these drawings without involving any inventive effort.

DETAILED DESCRIPTION OF EMBODIMENTS

In order to make the objects, technical solutions and advantages of embodiments of the present application clearer, the technical solutions in the embodiments of the present application will be clearly and completely described below with reference to the drawings for the embodiments of the present application. Apparently, the described embodiments are some of, rather than all of, the embodiments of the present application. Based on the embodiments given in the present application, all other embodiments that would be obtained by those of ordinary skill in the art without expending inventive effort shall all fall within the scope of protection of the present application.

Embodiments of the present application provide a control method, a photographing apparatus, a movable platform, and a computer readable medium. The movable platform may be a hand-held phone, a hand-held gimbal, an unmanned aerial vehicle, an unmanned vehicle, an unmanned ship, a robot, an autonomous vehicle, etc. The following description of the movable platform of the present application takes an unmanned aerial vehicle as an example. It will be apparent to those skilled in the art that other types of unmanned aerial vehicles can be used without limitation, and embodiments of the present application can be applied to various types of unmanned aerial vehicles. As an example, the unmanned aerial vehicle may be a small or large unmanned aerial vehicle. In some embodiments, the unmanned aerial vehicle may be an unmanned rotorcraft, for example, an unmanned multi-rotor aircraft propelled via air by a plurality of propelling devices, but embodiments of the present application are not limited thereto, and the unmanned aerial vehicles may also be other types of unmanned aerial vehicles.

Figure 1A:
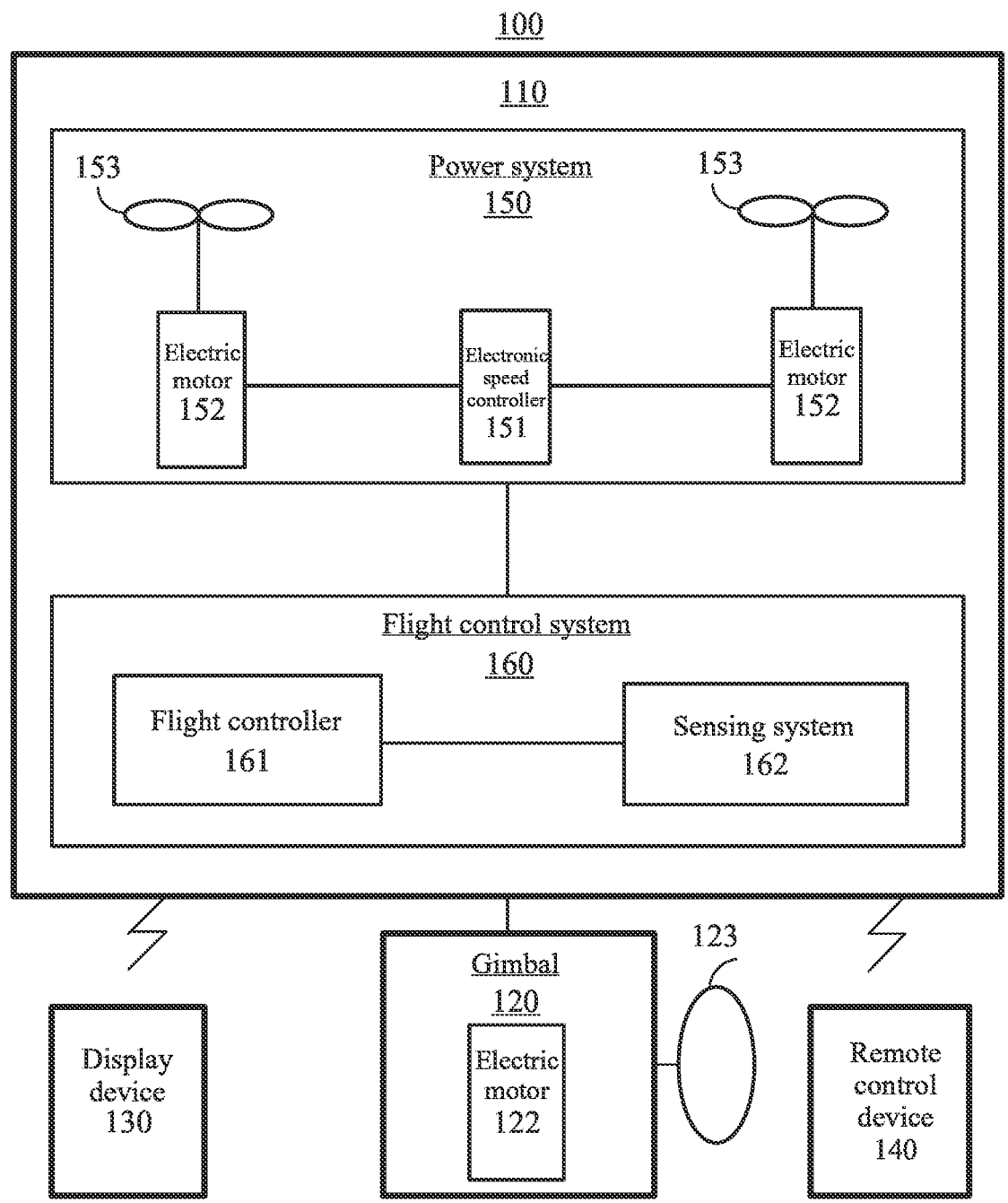
FIG. 1A is a schematic architectural diagram of an unmanned flight system provided in an embodiment of the present application.

FIG. 1A is a schematic architectural diagram of an unmanned flight system according to an embodiment of the present application. This embodiment is illustrated by taking the unmanned rotorcraft as an example.

An unmanned flight system 100 may comprise an unmanned aerial vehicle 110, a display device 130 and a remote-control device 140. The unmanned aerial vehicle 110 may comprise a power system 150, a flight control system 160, a frame, and a gimbal 120 carried on the frame. The unmanned aerial vehicle 110 may communicate wirelessly with the remote-control device 140 and the display device 130.

The frame may comprise a body and a stand (also known as a landing gear). The body may comprise a central frame and one or more arms connected to the central frame, the one or more arms extending radially from the central frame. The stand is connected to the body for a supporting purpose when the unmanned aerial vehicle 110 is landing.

The power system 150 may comprise one or more electronic speed controllers (referred to as ESCs) 151, one or more propellers 153, and one or more electric motors 152 corresponding to the one or more propellers 153, wherein the electric motor 152 is connected between the electronic speed controller 151 and the propeller 153, and the electric motor 152 and the propeller 153 are provided on the arm of the unmanned aerial vehicle 110; and the electronic speed controller 151 is used to receive a driving signal generated by the flight control system 160 and supply, according to the driving signal, a driving current to the electric motor 152 to control the rotation speed of the electric motor 152. The electric motor 152 is used to drive the rotation of the propeller to provide power for the flight of unmanned aerial vehicle 110, which enables the unmanned aerial vehicle 110 to move in one or more degrees of freedom. In some embodiments, the unmanned aerial vehicle 110 may rotate about one or more axes of rotation. As an example, the axes of rotation may include a roll axis, a yaw axis, and a pitch axis. It should be understood that the electric motor 152 may be a DC electric motor or an AC electric motor. In addition, the electric motor 152 may be a brushless electric motor or a brushed electric motor.

The flight control system 160 may comprise a flight controller 161 and a sensing system 162. The sensing system 162 is used to measure attitude information of the unmanned aerial vehicle, that is, position information and state information of the unmanned aerial vehicle 110 in space, such as three-dimensional position, three-dimensional angle, three-dimensional velocity, three-dimensional acceleration, and three-dimensional angular velocity. The sensing system 162 can include, for example, at least one of a gyroscope, an ultrasonic sensor, an electronic compass, an Inertial Measurement Unit (IMU), a vision sensor, a global navigation satellite system, a barometer, and other sensors. As an example, the global navigation satellite system may be a Global Positioning System (GPS). The flight controller 161 is used to control the flight of the unmanned aerial vehicle 110, for example, the flight of the unmanned aerial vehicle 110 can be controlled based on the attitude information measured by the sensing system 162. It should be understood that the flight controller 161 may control the unmanned aerial vehicle 110 in accordance with pre-programmed program instructions, or may control the unmanned aerial vehicle 110 in response to one or more remote control signals from the remote-control device 140.

The gimbal 120 may comprise an electric motor 122. The gimbal is used to carry a photographing apparatus 123. The flight controller 161 can control the motion of the gimbal 120 via the electric motor 122. Optionally, as another embodiment, the gimbal 120 may further comprise a controller for controlling the motion of the gimbal 120 by controlling the electric motor 122. It should be understood that the gimbal 120 may be independent of the unmanned aerial vehicle 110 or part of the unmanned aerial vehicle 110. It should be understood that the electric motor 122 may be a DC electric motor or an AC electric motor. In addition, the electric motor 122 may be a brushless electric motor or a brushed electric motor. It should also be understood that the gimbal may be located at the top or bottom of the unmanned aerial vehicle.

The photographing apparatus 123 may be, for example, a device for capturing an image, such as a camera or a video camera, and the photographing apparatus 123 may communicate with the flight controller and perform photographing under the control of the flight controller. The photographing apparatus 123 of this embodiment comprises at least a photosensitive element, which may be, for example, a Complementary Metal Oxide Semiconductor (CMOS) sensor or a Charge-coupled Device (CCD) sensor. It can be understood that the photographing apparatus 123 may also be directly fixed to the unmanned aerial vehicle 110, so that the gimbal 120 can be omitted.

The display device 130 is located on a ground-based terminal of the unmanned flight system 100, can communicate wirelessly with the unmanned aerial vehicle 110, and can be used to display the attitude information of the unmanned aerial vehicle 110. In addition, an image captured by the photographing apparatus 123 can also be displayed on the display device 130. It should be understood that the display device 130 may be a separate device or may be integrated into the remote-control device 140.

The remote-control device 140 is located on the ground-based terminal of the unmanned flight system 100, and can communicate wirelessly with the unmanned aerial vehicle 110 for remote manipulation of the unmanned aerial vehicle 110.

It should be understood that the nomenclature for the components of the unmanned flight system is for the purpose of identification only and should not be construed as limiting the embodiments of the present application.

The photographing apparatus 123 in the embodiment of the present application may comprise at least one of a lens and a body. Accordingly, the control method can be applied to at least one of the lens and the body. The photographing apparatus 123 may be used as a hand-held device or mounted on a movable platform. The readable storage medium can be used to store programs, instructions, data, etc. that implement the control method.

Figure 1B:
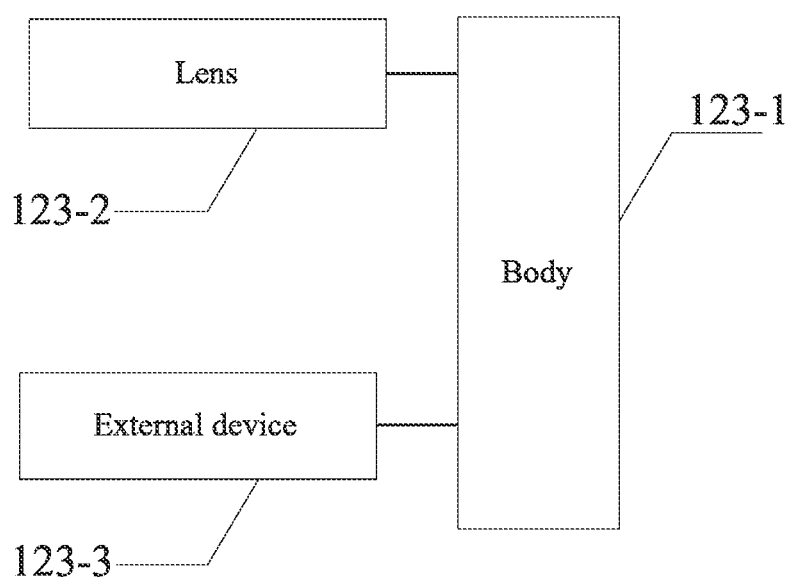
FIG. 1B is a schematic structural diagram of a photographing apparatus provided in an embodiment of the present application.

Referring to FIG. 1B, the body 123-1 is communicatively connected to the lens 123-2 and an external device 123-3, for example, signals or information can be transmitted between the body 123-1 and each of the lens 123-2 and the external device 123-3 to complete the coordinated operation of the three, such as the timing control of the body 123-1, the lens 123-2 and a flash during exposure.

The lens may be detachable from or integrated with the body. The external device may be detachable from or integrated with the body. As an example, the photographing apparatus can be applied to a hand-held device with a photographing function, including but not limited to a mobile phone, a tablet computer, a digital camera, etc. In the case of the mobile phone, the lens and the body are generally integrally-formed and non-detachable. For the digital camera, the lens and body can be either detachable and replaceable, or integrally-formed and non-detachable.

The lens may comprise a shutter, which may be a mechanical shutter such as a blade shutter. The body may comprise an image sensor and a processor. The image sensor includes, but is not limited to, a CMOS image sensor, a CCD image sensor, etc. During exposure, the shutter is closed after opening for a certain period of time. When the shutter is open, light rays pass through the lens to reach the image sensor. The processor triggers the resetting of the image sensor and reads image information acquired by the image sensor.

Figure 2:
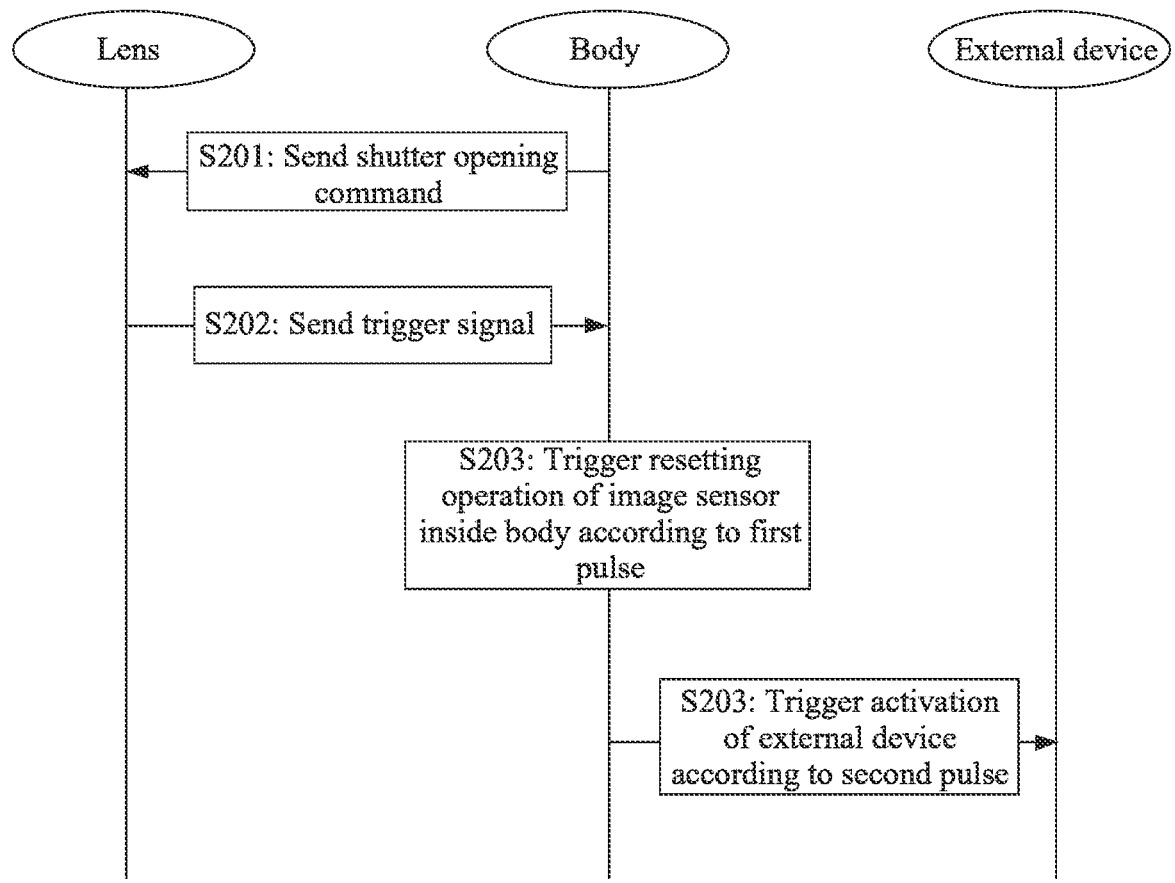
FIG. 2 is a flow chart of a control method provided in an embodiment of the present application.

FIG. 2 is a flow chart of a photographing control method according to an embodiment of the present application. The control method is applied to a photographing apparatus comprising a lens, an external device and a body. The body is communicatively connected to the lens and the external device, respectively. Referring to FIG. 2, the control method comprises:

S201: the body sending a shutter opening command to the lens.

Taking the case where the photographing apparatus is a digital camera as an example, when a user presses a shooting button, the body is triggered to send the shutter opening command to the lens to instruct the lens to open the shutter.

S202: the lens sending a trigger signal to the body according to the shutter opening command.

The lens opens the shutter upon receiving the shutter opening command, and sends the trigger signal to the body over a time of period in which the shutter is in an open state. The trigger signal comprises a first pulse and a second pulse.

Figure 3:
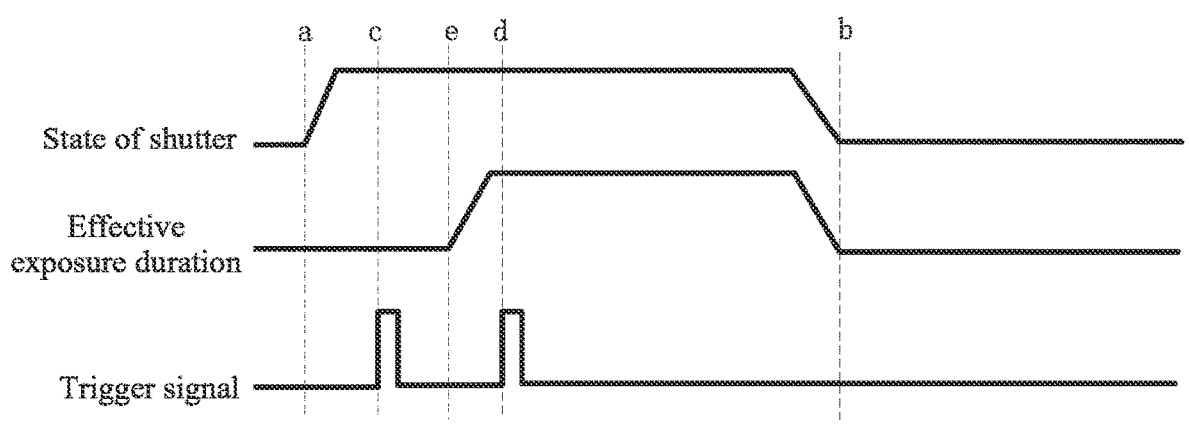
FIG. 3 is a schematic diagram of signal timing corresponding to a control method provided in an embodiment of the present application.

Referring to FIG. 3, an embodiment of the present application is described by taking the case where the first pulse is sent first and the second pulse is sent later as an example. The shutter is opened at a time point a and is closed at a time point b, and the lens sends the first pulse and the second pulse to the body over the time period a-b, wherein a rising edge of the first pulse is at a time point c, and a rising edge of the second pulse is at a time point d.

S203: the body receiving the trigger signal sent from the lens, triggering a resetting operation of an image sensor inside the body according to the first pulse and triggering the activation of the external device according to the second pulse.

In one embodiment, the body triggers the resetting operation of the image sensor when receiving the first pulse, and the image sensor performs the resetting operation.

Referring to FIG. 3, the body triggers the resetting operation of the image sensor when receiving the first pulse at the time point c, and the image sensor completes the resetting operation at a time point e and enters an effective exposure phase. In the embodiment of the present application, the length of the period of time from the completion of the resetting operation of the image sensor to the closing of the shutter, that is, the length of the period of time e-b, is referred to as an effective exposure duration. As the effective exposure duration varies, the obtained photographing effects are usually different. In the embodiment of the present application, the effective exposure duration can be adjusted according to the position of the first pulse in the period of time a-b to obtain different photographing effects.

In one embodiment, the body triggers the activation of the external device when receiving the second pulse.

Referring to FIG. 3, the body triggers the activation of the external device when receiving the second pulse at a time point d. Taking the case where the external device is a flash as an example, the triggering of the activation of the external device may refer to the triggering of the flash to perform exposure compensation. Generally, different photographing effects are obtained when the flash performs exposure compensation at different time points. In the embodiment of the present application, the time point at which the external device is activated is adjusted according to the position of the second pulse in the period of time a-b to obtain different photographing effects.

In one embodiment, working modes of the body includes a first working mode and a second working mode.

As an example, in the first working mode, the body receives the first pulse, and gates the first pulse to the image sensor to trigger the resetting operation of the image sensor. In the second working mode, the body receives the second pulse, and gates the second pulse to the external device to trigger the activation of the external device.

The body switches from the first working mode to the second working mode after the arrival of the first pulse and before the arrival of the second pulse. After the time point b, the body switches from the second working mode back to the first working mode until the first pulse is received again. Through the mode switching, the body gates the two pulses to the image sensor and the external device, respectively, to trigger the resetting operation of the image sensor and the activation of the external device, respectively.

In one embodiment, the body may trigger the mode switching through an interrupt mechanism. As an example, in the first working mode, the body triggers a rising edge of the interrupt when a rising edge of the first pulse arrives, and gates the first pulse to the image sensor to trigger the resetting operation of the image sensor. The first working mode is switched to the second working mode when a falling edge of the interrupt is detected by the body. In the second working mode, the body receives the second pulse sent from the lens, and gates the second pulse to the external device to trigger the activation of the external device.

In the technical solutions provided in the embodiment of the present application, two pulse signals are used to control the resetting of the image sensor and the activation of the external device, so that the resetting time point of the image sensor and the activation time point of the external device are independent of each other, and thus the two time points can be set separately. When the time intervals between the two time points and the shutter opening time point a or the shutter closing time point b are different, or when the time interval between the two time points is different, the obtained photographing effect can be different. Therefore, by applying the technical solution provided in the present application, various photographing effects can be obtained to meet more diverse photographing requirements.

Figure 4:
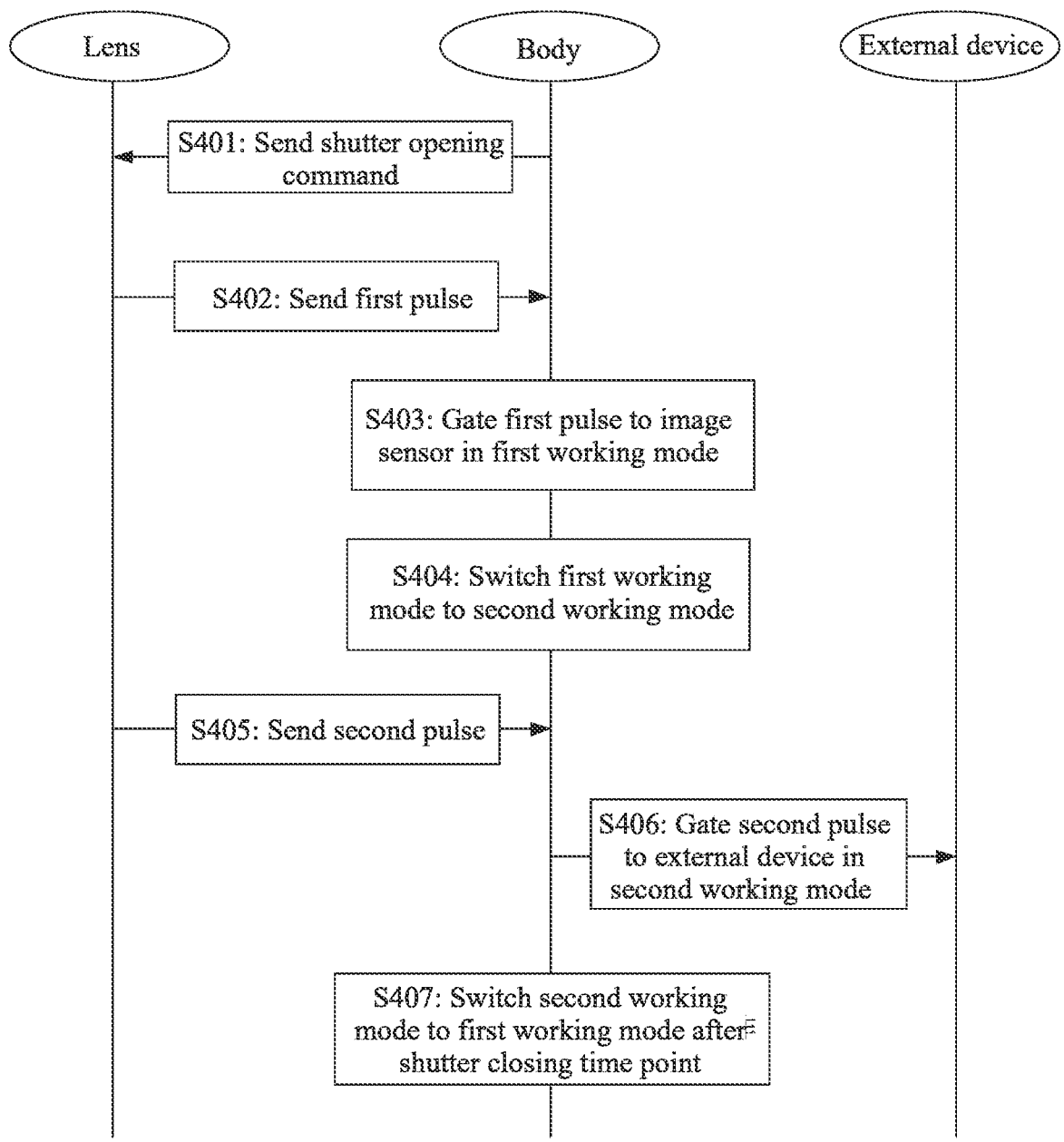
FIG. 4 is a flow chart of a control method provided in an embodiment of the present application.

FIG. 4 is a flow chart of a photographing control method according to an embodiment of the present application. The control method is applied to a photographing apparatus comprising a lens, an external device and a body. The body is communicatively connected to the lens and the external device, respectively. Referring to FIG. 4, the control method comprises:

S401: the body sending a shutter opening command to the lens.

In one embodiment, the shutter opening command comprises a shutter duration and an effective exposure duration. Referring to FIG. 3, the shutter duration refers to the length of time that the shutter lasts from an opening time point to a closing time point, that is, the length of the period of time a-b in FIG. 3. The effective exposure duration refers to the length of time for which the image sensor is effectively exposed, that is, the length of e-b in FIG. 3.

S402: the lens sending a first pulse to the body.

After receiving the shutter opening command, the lens determines the shutter opening time point a and the shutter closing time point b according to the shutter duration, and determines an effective exposure starting point e according to the effective exposure duration.

As an example, the shutter duration is 10 ms and the effective exposure duration is 1 ms. After the lens determines that the shutter is open, it needs to remain open for 10 ms and then close. The effective exposure period lasts from the 9th ms until the shutter is closed. The lens then can generate and send the first pulse between the shutter opening time point a and the effective exposure starting point e, that is, the first pulse is generated and sent between the 1st and 9th ms.

The time point T at which the lens sends the first pulse to the body may have a certain time interval G from the effective exposure starting point e. As an example, if the length of time required by the image sensor from the reception of an instruction that triggers the resetting operation to the completion of the resetting operation is denoted by R, the time interval may be equal to R, that is, the lens can send the first pulse to the body at T=(9−R) ms, where the value of R may be a pre-set value. Of course, this is only an exemplary description, and the specific value of the time interval G is not limited in the embodiment of the present application.

S403: in a first working mode, the body gating the first pulse to the image sensor to trigger the resetting operation of the image sensor.

In one embodiment, working modes of the body includes a first working mode and a second working mode, wherein the first working mode is a default working mode. The body sends the shutter opening command to the lens in the first working mode, and receives the first pulse returned by lens and gates the first pulse to the image sensor in the first working mode.

Figure 5:
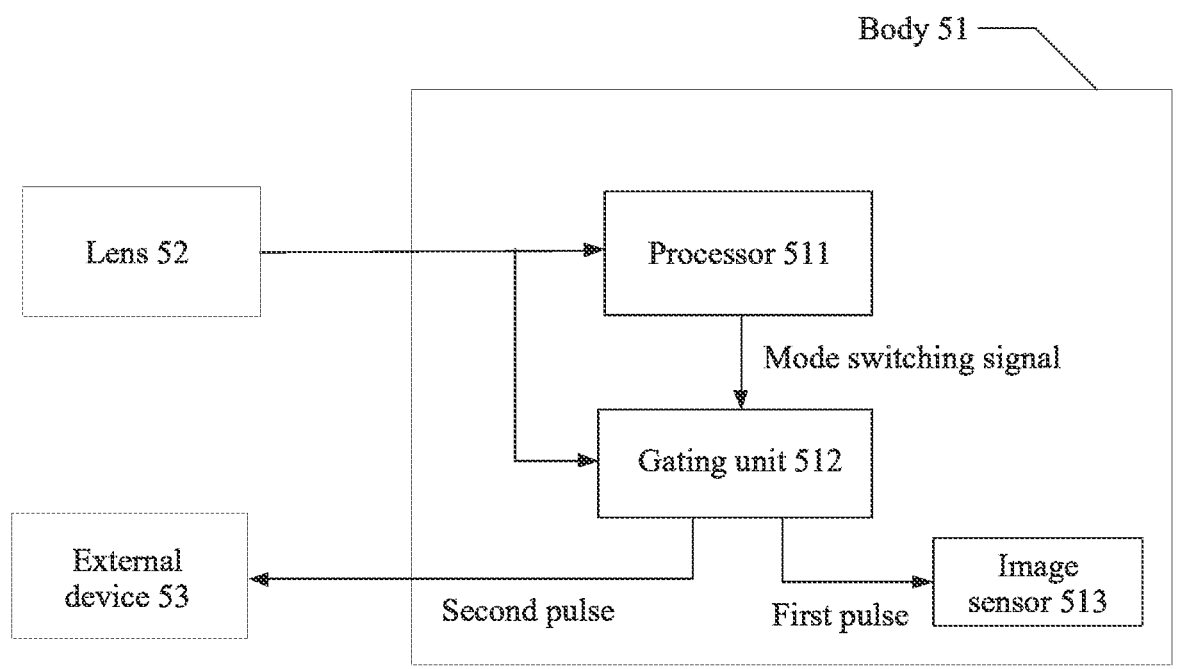
FIG. 5 is a schematic structural diagram of a photographing apparatus provided in an embodiment of the present application.

As an example, referring to the schematic structural diagram shown in FIG. 5, the body 51 comprises a processor 511 and a gating unit 512. The lens 52 is communicatively connected to the processor 511 and the gating unit 512, respectively, and the processor 511 and the gating unit 512 can respectively receive a trigger signal sent from the lens 52. The gating unit 512 is communicatively connected to the processor 511, the external device 53 and the image sensor 513, respectively.

In the first working mode, an input end of the gating unit 512 connected to the lens 52 and an output end thereof connected to the image sensor 513 are gated.

When the gating unit 512 receives the first pulse from the lens 52, the first pulse is gated to the image sensor 513 to trigger a resetting operation of the image sensor 513. Referring to the schematic diagram of signal timing shown in FIG. 6, the signal received by the image sensor 513 from the gating unit 512 is represented by an image sensor resetting signal in FIG. 6.

S404: the body switching from the first working mode to the second working mode.

In one embodiment, the body switches from the first working mode to the second working mode after the arrival of the first pulse and before the arrival of a second pulse.

Figure 6:
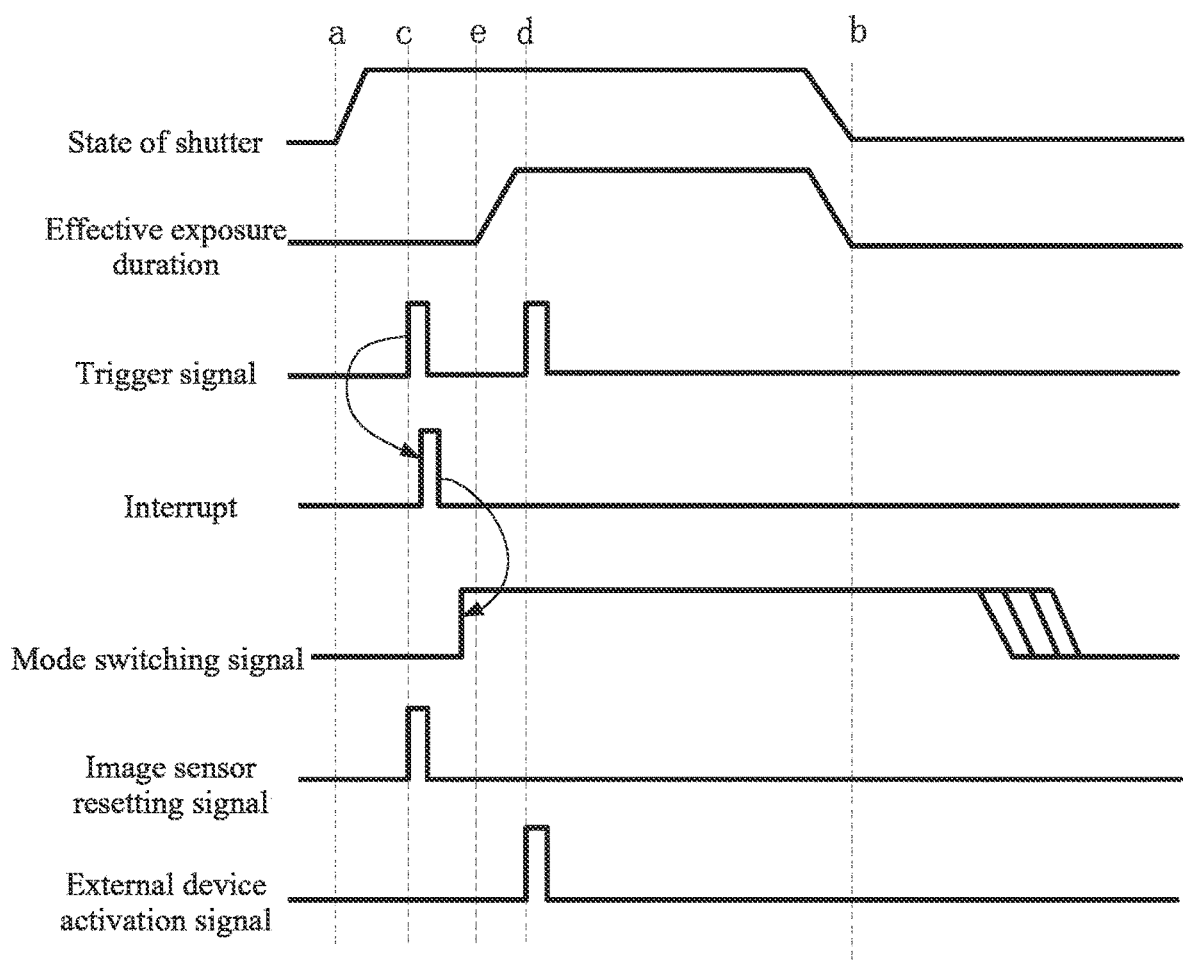
FIG. 6 is a schematic diagram of signal timing corresponding to a control method provided in an embodiment of the present application.

As an example, referring to the schematic structural diagram shown in FIG. 5 and the schematic diagram of signal timing shown in FIG. 6, in the first working mode, the processor 511 triggers the rising edge of the interrupt of the processor 511 when the rising edge of the first pulse arrives. When the falling edge of the interrupt is detected, the processor 511 generates a mode switching signal and sends same to the gating unit 512 to trigger the switching of the gating unit 512 from the first working mode to the second working mode.

In the second working mode, the input end of the gating unit 512 connected to the lens 52 and an output end thereof connected to the external device 53 are gated.

S405: the lens sending the second pulse to the body.

Taking the case where the external device is a flash as an example, the flash generally needs to be fired during the effective exposure, so the second pulse can be generated and sent between the effective exposure starting point e and the shutter closing time point b.

A certain time interval needs to be reserved between the first pulse and the second pulse to ensure that the lens sends the second pulse to the body after the body switches to the second working mode. As an example, as shown in FIG. 6, the rising edge of the second pulse arrives after the falling edge of the interrupt.

In one embodiment, the time interval between the rising edge of the first pulse and the rising edge of the second pulse is not less than a first threshold, the first threshold being dependent on a response time required from the triggering of the interrupt to the completion of the switching between the working modes.

The first threshold may be a pre-set value. Since the response time for the processor to process the interrupt is usually very short, the pre-set value only needs to be greater than the response time. That is to say, after the lens sends the first pulse, it needs to wait at least for the time interval having a length equal to the pre-set value before sending the second pulse, so as to ensure that the body has switched from the first working mode to the second working mode.

S406: in a second working mode, the body gating the second pulse to the external device to trigger the activation of the external device.

In combination with S404, in the second working mode, the input end of the gating unit 512 connected to the lens 52 and the output end thereof connected to the external device 53 are gated.

In combination with Step 405, the lens sends the second pulse to the body after the body switches to the second working mode. At this time, the gating unit 512 gates the second pulse received from the lens 52 to the external device 53 to trigger the activation of the external device 53. The signal received by the external device 53 from the gating unit 512 is represented by an external device activation signal in FIG. 6.

In one embodiment, the external device is a flash, and the triggering of the activation of the external device may refer to the triggering of the flash to perform exposure compensation.

In one embodiment, the external device is a positioning apparatus, and the triggering of the activation of the external device may refer to the triggering of the positioning apparatus to acquire current position information. After the exposure is over, the processor inside the body can save the captured photos and the position information in a memory.

S407: the body switching from the second working mode to the first working mode after the shutter closing time point.

Referring to FIGS. 5 and 6, after the shutter closing time point b, the processor 511 may pull down the mode switching signal, and trigger the gating unit 512 to switch from the second working mode to the first working mode.

After the body switches back to the first working mode, the process may skip to step S401 and be performed again, that is, the next photographing is performed. Generally, after the shutter closing time point b, the mode switching signal needs to be held high for a period of time, and the processor stores the currently captured photos and then pulls down the mode switching signal, such that the body switches from the second working mode to the first working mode.

In the technical solution provided in the embodiment of the present application, two pulse signals are used to control the resetting of the image sensor and the activation of the external device, so that the resetting time point of the image sensor and the activation time point of the external device are independent of each other, and thus the two time points can be separately set to adjust the effective exposure duration and the activation time point of the external device, so as to obtain various photographing effects.

In the case of a given exposure time, as the activation time point of the external device varies, the obtained photographing effect is different. In one embodiment, the rising edge of the second pulse triggers the activation of the external device, so different photographing effects can be obtained by adjusting the time point corresponding to the rising edge of the second pulse. As an example, the lens can determine the rising edge of the second pulse, i.e. the time point corresponding to the rising edge of the second pulse, according to the exposure mode of the photographing apparatus or the type of the external device.

By way of example, the exposure mode of the photographing apparatus includes a front curtain exposure mode, a rear curtain exposure mode, and a middle exposure mode.

The time point corresponding to the rising edge of the second pulse corresponding to each exposure mode is described below.

Referring to FIG. 6, when the exposure mode of the photographing apparatus is the front curtain exposure mode, the lens determines that the time interval between the effective exposure starting point e and the rising edge d of the second pulse is less than the time interval between the falling edge of the second pulse and the shutter closing time point b.

In the front curtain exposure mode, the external device is triggered to be activated during the first half of the effective exposure duration e-b. Taking the case where the external device is a flash as an example, the flash performs exposure compensation in the first half of the effective exposure duration e-b.

Figure 7:
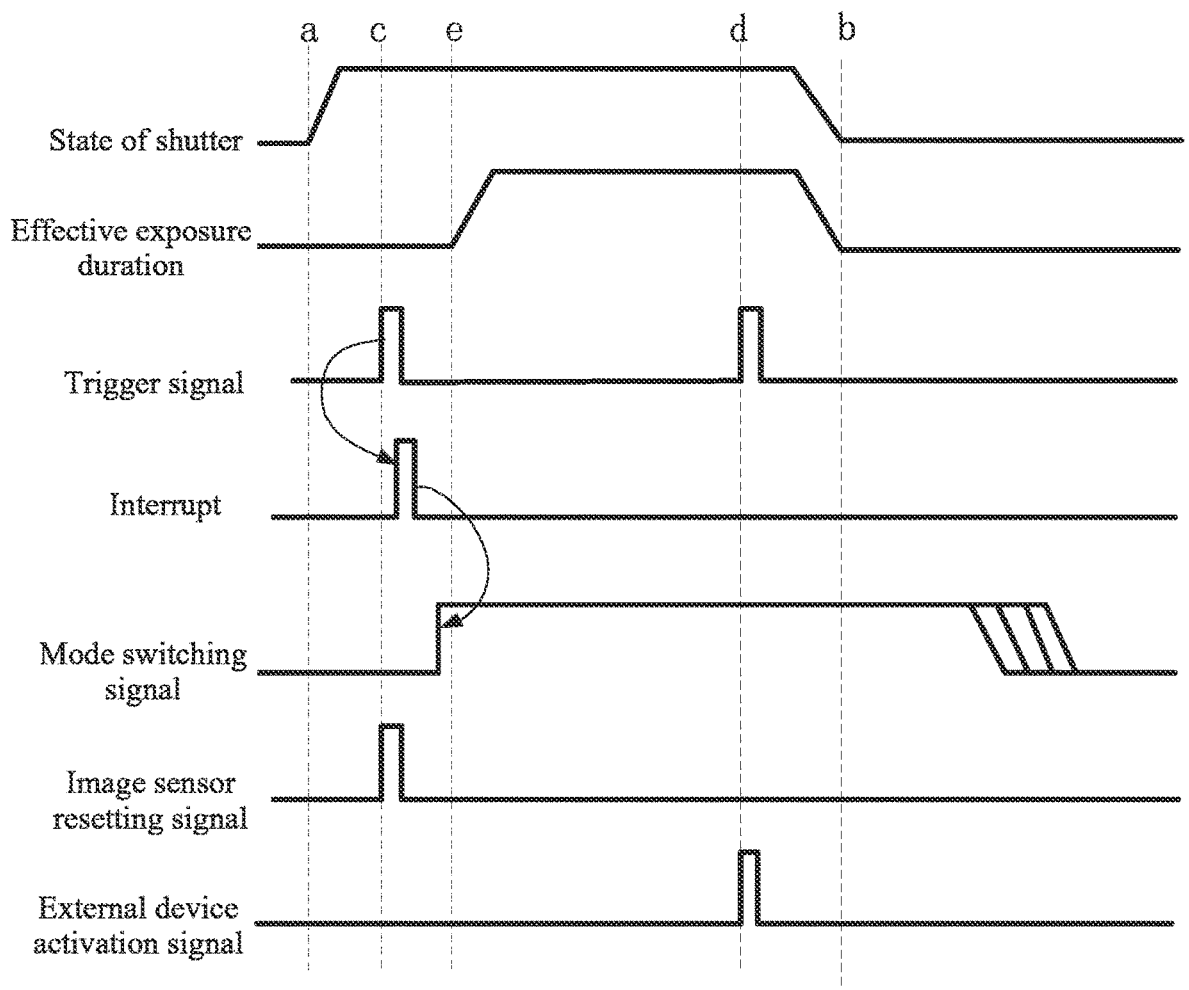
FIG. 7 is a schematic diagram of signal timing corresponding to a control method provided in an embodiment of the present application.

Referring to FIG. 7, when the exposure mode of the photographing apparatus is the rear curtain exposure mode, the lens determines that the time interval between the effective exposure starting point e and the rising edge d of the second pulse is greater than the time interval between the falling edge of the second pulse and the shutter closing time point b.

In the rear curtain exposure mode, the external device is triggered to be activated during the second half of the effective exposure duration e-b. Taking the case where the external device is a flash as an example, the flash performs exposure compensation in the second half of the effective exposure duration e-b.

Figure 8:
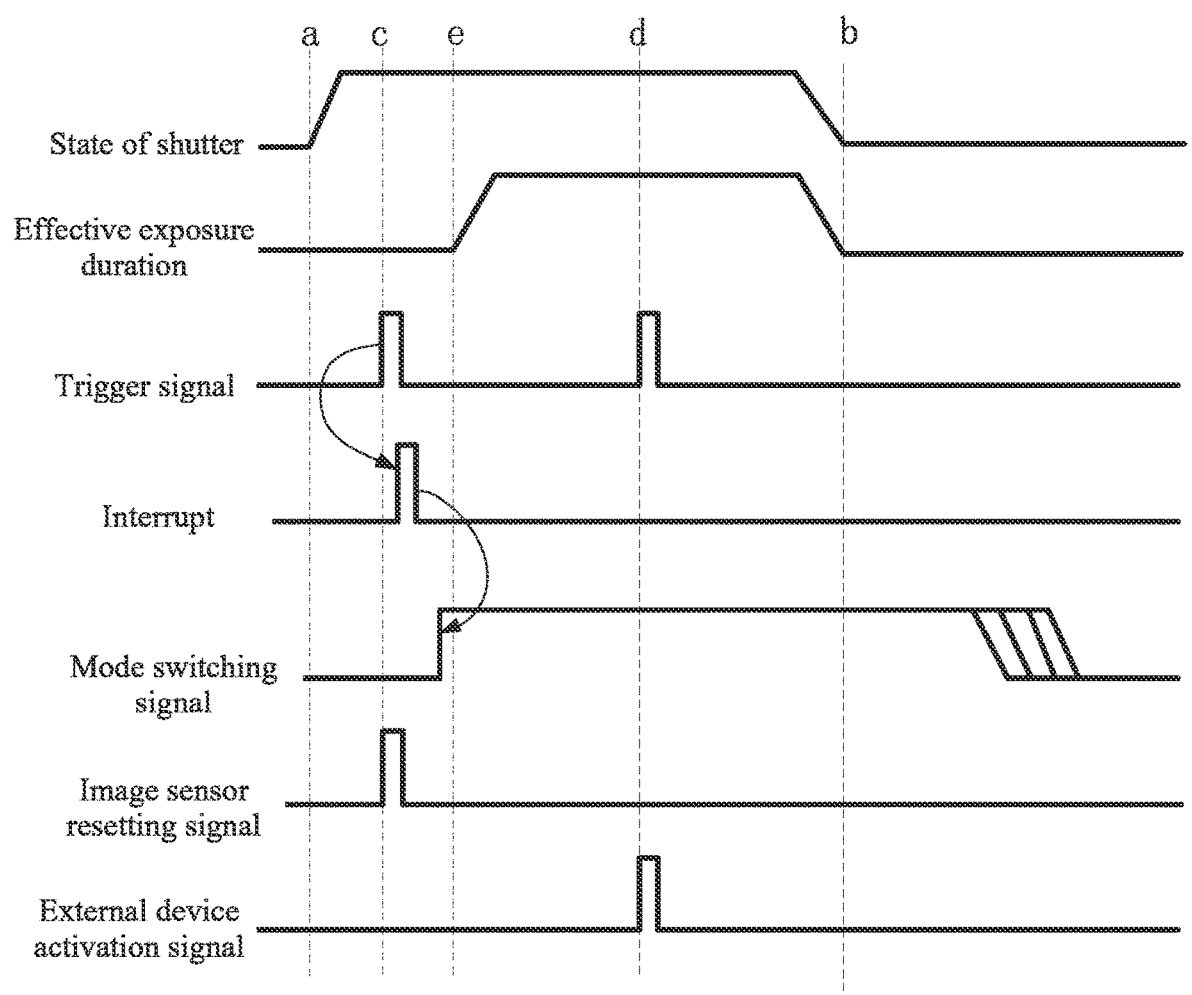
FIG. 8 is a schematic diagram of signal timing corresponding to a control method provided in an embodiment of the present application.

Referring to FIG. 8, when the exposure mode of the photographing apparatus is the middle exposure mode, the lens determines that the time interval between the effective exposure starting point e and the rising edge d of the second pulse is equal to the time interval between the falling edge of the second pulse and the shutter closing time point b.

In the middle exposure mode, the external device is triggered to be activated at the middle point of the effective exposure duration e-b. Taking the case where the external device is a flash as an example, the flash performs exposure compensation at the middle point of the effective exposure duration e-b.

When the external device is a positioning apparatus, the positioning apparatus can also be triggered to acquire the current position information during the first half, during the second half, or at the middle point of effective exposure duration e-b. When photographing during movement (e.g., when the photographing apparatus is mounted on an unmanned aerial vehicle for photographing), the position information may be acquired at different time points to meet different application requirements.

By way of example, the external device may include a flash apparatus (e.g., a flash lamp), a positioning apparatus, etc. When the device is of different types, the time point corresponding to the rising edge of the second pulse is described below.

When the external device is the flash apparatus, the lens determines that the time interval between the effective exposure starting point e and the rising edge d of the second pulse is greater or less than the time interval between the falling edge of the second pulse and the shutter closing time point b.

That is, the flash apparatus can perform exposure compensation in the first half or the second half of the effective exposure duration e-b.

When the external device is the positioning apparatus, the lens determines that the time interval between the effective exposure starting point e and the rising edge of the second pulse is equal to the time interval between the falling edge of the second pulse and the shutter closing time point b.

That is, the positioning apparatus acquires the current position information at the middle point of the effective exposure duration e-b. Taking the case where the photographing apparatus is installed on an unmanned aerial vehicle for photographing as an example, since the unmanned aerial vehicle is often in a moving state during the photographing, the position information of the unmanned aerial vehicle will continuously change within the effective exposure duration e-b, and the actual position information acquired by the positioning apparatus is the position information of the unmanned aerial vehicle at a certain moment within the effective exposure duration e-b. The position information acquired at the middle point of the effective exposure duration e-b can more accurately reflect the actual position of the unmanned aerial vehicle within the effective exposure duration e-b.

In the technical solution provided in the embodiment of the present application, two pulse signals are used to control the resetting of the image sensor and the activation of the external device, so that the resetting time point of the image sensor and the activation time point of the external device are independent of each other, and thus the two time points can be separately set to adjust the effective exposure duration and the activation time point of the external device, so as to obtain various photographing effects, or to meet different photographing requirements.

The photographing control method provided in the embodiment of the present application may be applied to a photographing apparatus comprising a lens, an external device and a body, that is, the photographing apparatus can perform all the steps in the foregoing method embodiments.

An embodiment of the present application further provides a body of a photographing apparatus, which body can perform at least the steps performed by the body in the foregoing method embodiments.

In one embodiment, the steps performed by the body comprise:

the body sending a shutter opening command to the lens;

the body receiving a trigger signal sent from the lens, the trigger signal comprising a first pulse and a second pulse; and the body triggering a resetting operation of an image sensor inside the body according to the first pulse and triggering the activation of the external device according to the second pulse.

In one embodiment, the first pulse is prior to the second pulse, and the steps performed by the body comprise:

in a first working mode, the body gating the first pulse to the image sensor to trigger the resetting operation of the image sensor; and in a second working mode, the body gating the second pulse to the external device to trigger the activation of the external device.

The body switches from the first working mode to the second working mode after the arrival of the first pulse and before the arrival of the second pulse.

In one embodiment, the steps performed by the body comprise:

in the first working mode, the body triggering a rising edge of an interrupt when a rising edge of the first pulse arrives; and switching the body from the first working mode to the second working mode when a falling edge of the interrupt is detected by the body.

In one embodiment, the body comprises a processor and a gating unit, the lens is communicatively connected to the processor and the gating unit, respectively, and the gating unit is communicatively connected to the processor, the external device, and the image sensor, respectively.

The processor and the gating unit respectively receive the trigger signal sent from the lens.

In the first working mode, the gating unit gates the first pulse to the image sensor.

In the second working mode, the gating unit gates the second pulse to the external device.

In the first working mode, the processor triggers the rising edge of the interrupt of the processor when the rising edge of the first pulse arrives.

The processor triggers the switching of the gating unit from the first working mode to the second working mode when the falling edge of the interrupt is detected.

In one embodiment, a rising edge of the second pulse arrives after the falling edge of the interrupt.

In one embodiment, the time interval between the rising edge of the first pulse and the rising edge of the second pulse is not less than a first threshold, the first threshold being dependent on a response time required from the triggering of the interrupt to the completion of the switching between the working modes.

The body can control the resetting of the image sensor and the activation of the external device according to the two pulse signals, so that the resetting time point of the image sensor and the activation time point of the external device are independent of each other, and thus the two time points can be separately set to adjust the effective exposure duration and the activation time point of the external device, so as to obtain various photographing effects, or to meet different photographing requirements.

An embodiment of the present application further provides a lens, which can perform at least the steps performed by the lens in the foregoing method embodiments.

In one embodiment, the steps performed by the lens comprise:
the lens receiving a shutter opening command sent from the body; and
the lens sending a trigger signal to the body according to the shutter opening command, the trigger signal comprising a first pulse and a second pulse, such that the body triggers a resetting operation of an image sensor inside the body according to the first pulse, and triggers the activation of the external device according to the second pulse.

In one embodiment, the shutter opening command comprises a shutter duration and an effective exposure duration, and the steps performed by the lens comprise:
the lens determining a shutter opening time point and a shutter closing time point according shutter duration;
the lens determining an effective exposure starting point according to the effective exposure duration; and
the lens generating and sending the first pulse between the shutter opening time point and the effective exposure starting point, and generating and sending the second pulse between the effective exposure starting point and the shutter closing time point.

In one embodiment, the body comprises a processor and a gating unit, the lens is communicatively connected to the processor and the gating unit, respectively, and the steps performed by the lens comprise:
the lens sending the trigger signal to the processor and the gating unit, respectively, according to the shutter opening command.

In one embodiment, the steps performed by the lens comprise:
the lens determining the rising edge of the second pulse according to an exposure mode of the photographing apparatus.

In one embodiment, the exposure mode of the photographing apparatus is a front curtain exposure mode, and the steps performed by the lens comprise:
the lens determining that a time interval between the effective exposure starting point and the rising edge of the second pulse is less than a time interval between a falling edge of the second pulse and the shutter closing time point.

In one embodiment, the exposure mode of the photographing apparatus is a rear curtain exposure mode, and the steps performed by the lens comprise:
the lens determining that a time interval between the effective exposure starting point and the rising edge of the second pulse is greater than a time interval between a falling edge of the second pulse and the shutter closing time point.

In one embodiment, the exposure mode of the photographing apparatus is a middle exposure mode, and the steps performed by the lens comprise:
the lens determining that a time interval between the effective exposure starting point and the rising edge of the second pulse is equal to a time interval between a falling edge of the second pulse and the shutter closing time point.

In one embodiment, the steps performed by the lens comprise:
the lens determining the rising edge of the second pulse according to the type of the external device.

In one embodiment, the external device is a flash apparatus, and the steps performed by the lens comprise:
the lens determining the rising edge of the second pulse according to the type of the external device, which comprises:
the lens determining that a time interval between the effective exposure starting point and the rising edge of the second pulse is greater or less than a time interval between a falling edge of the second pulse and the shutter closing time point.

In one embodiment, the external device is a positioning apparatus, and the steps performed by the lens comprise:
the lens determining the rising edge of the second pulse according to the type of the external device, which comprises:
the lens determining that a time interval between the effective exposure starting point and the rising edge of the second pulse is equal to a time interval between a falling edge of the second pulse and the shutter closing time point.

Figure 9:
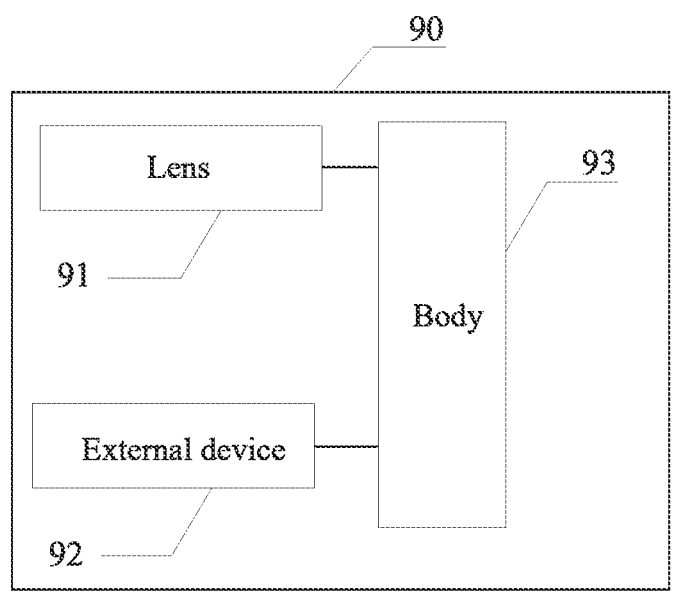
FIG. 9 is a schematic structural diagram of a photographing apparatus provided in an embodiment of the present application.

Referring to FIG. 9, an embodiment of the present application provides a photographing apparatus 90 comprising a lens 91, an external device 92 and a body 93. The body 93 is communicatively connected to the lens 91 and the external device 92, respectively.

The body 93 is configured for sending a shutter opening command to the lens 91.

The lens 91 is configured for sending, according to the shutter opening command, a trigger signal to the body 93, the trigger signal comprising a first pulse and a second pulse.

The body 93 is further configured for receiving the trigger signal sent from the lens 91, triggering, according to the first pulse, a resetting operation of an image sensor inside the body 93, and triggering, according to the second pulse, the activation of the external device 92.

In one embodiment, the shutter opening command comprises a shutter duration and an effective exposure duration.

The lens 91 is specifically configured for:

determining a shutter opening time point and a shutter closing time point according shutter duration;

determining an effective exposure starting point according to the effective exposure duration; and generating and sending the first pulse between the shutter opening time point and the effective exposure starting point, and generating and sending the second pulse between the effective exposure starting point and the shutter closing time point.

In one embodiment, the first pulse is prior to the second pulse, and the body 93 is specifically configured for:

in a first working mode, gating the first pulse to the image sensor to trigger the resetting operation of the image sensor; and in a second working mode, gating the second pulse to the external device 92 to trigger the activation of the external device 92.

The first working mode is switched to the second working mode after the arrival of the first pulse and before the arrival of the second pulse.

In one embodiment, the body 93 is specifically configured for:

in the first working mode, triggering a rising edge of an interrupt when a rising edge of the first pulse arrives; and switching from the first working mode to the second working mode when a falling edge of the interrupt is detected.

In one embodiment, the body 93 comprises a processor and a gating unit, the lens 91 is communicatively connected to the processor and the gating unit, respectively, and the gating unit is communicatively connected to the processor, the external device 92, and the image sensor, respectively.

The processor and the gating unit are respectively configured for receiving the trigger signal sent from the lens 91.

The gating unit is specifically configured for: gating the first pulse to the image sensor in the first working mode; and gating the second pulse to the external device 92 in the second working mode.

The processor is specifically configured for: in the first working mode, triggering the rising edge of the interrupt of the processor when the rising edge of the first pulse arrives; and triggering the switching of the gating unit from the first working mode to the second working mode when the falling edge of the interrupt is detected.

In one embodiment, a rising edge of the second pulse arrives after the falling edge of the interrupt.

In one embodiment, the time interval between the rising edge of the first pulse and the rising edge of the second pulse is not less than a first threshold, the first threshold being dependent on a response time required from the triggering of the interrupt to the completion of the switching between the working modes.

In one embodiment, the lens 91 is further configured for determining the rising edge of the second pulse according to an exposure mode of the photographing apparatus 90.

In one embodiment, the exposure mode of the photographing apparatus 90 is a front curtain exposure mode.

The lens 91 is specifically configured for: determining that a time interval between the effective exposure starting point and the rising edge of the second pulse is less than a time interval between a falling edge of the second pulse and the shutter closing time point.

In one embodiment, the exposure mode of the photographing apparatus 90 is a rear curtain exposure mode.

The lens 91 is specifically configured for: determining that a time interval between the effective exposure starting point and the rising edge of the second pulse is greater than a time interval between a falling edge of the second pulse and the shutter closing time point.

In one embodiment, the exposure mode of the photographing apparatus 90 is a middle exposure mode.

The lens 91 is specifically configured for: determining that a time interval between the effective exposure starting point and the rising edge of the second pulse is equal to a time interval between a falling edge of the second pulse and the shutter closing time point.

In one embodiment, the lens 91 is further configured for: determining the rising edge of the second pulse according to the type of the external device 92.

In one embodiment, the external device 92 is a flash apparatus.

The lens 91 is specifically configured for: determining that a time interval between the effective exposure starting point and the rising edge of the second pulse is greater or less than a time interval between a falling edge of the second pulse and the shutter closing time point.

In one embodiment, the external device 92 is a positioning apparatus.

The lens 91 is specifically configured for: determining that a time interval between the effective exposure starting point and the rising edge of the second pulse is equal to a time interval between a falling edge of the second pulse and the shutter closing time point.

In one embodiment, the body 93 is further configured for:

switching from the second working mode to the first working mode after the shutter closing time point.

An embodiment of the present application provides a lens, which is communicatively connected to a body of a photographing apparatus, the photographing apparatus further comprising an external device, wherein the lens is configured for:

receiving a shutter opening command sent from the body; and sending a trigger signal to the body according to the shutter opening command, the trigger signal comprising a first pulse and a second pulse, such that the body triggers a resetting operation of an image sensor inside the body according to the first pulse, and triggers the activation of the external device according to the second pulse.

In one embodiment, the shutter opening command comprises a shutter duration and an effective exposure duration.

The lens is specifically configured for:

determining a shutter opening time point and a shutter closing time point according shutter duration;

determining an effective exposure starting point according to the effective exposure duration; and generating and sending the first pulse between the shutter opening time point and the effective exposure starting point, and generating and sending the second pulse between the effective exposure starting point and the shutter closing time point.

In one embodiment, the lens is communicatively connected to a processor and a gating unit, respectively, inside the body.

The lens is specifically configured for: sending the trigger signal to the processor and the gating unit, respectively, according to the shutter opening command.

In one embodiment, the lens is further configured for: determining the rising edge of the second pulse according to an exposure mode of the photographing apparatus.

In one embodiment, the exposure mode of the photographing apparatus is a front curtain exposure mode.

The lens is specifically configured for: determining that a time interval between the effective exposure starting point and the rising edge of the second pulse is less than a time interval between a falling edge of the second pulse and the shutter closing time point.

In one embodiment, the exposure mode of the photographing apparatus is a rear curtain exposure mode.

The lens is specifically configured for: determining that a time interval between the effective exposure starting point and the rising edge of the second pulse is greater than a time interval between a falling edge of the second pulse and the shutter closing time point.

In one embodiment, the exposure mode of the photographing apparatus is a middle exposure mode.

The lens is specifically configured for: determining that a time interval between the effective exposure starting point and the rising edge of the second pulse is equal to a time interval between a falling edge of the second pulse and the shutter closing time point.

In one embodiment, the lens is further configured for: determining the rising edge of the second pulse according to the type of the external device.

In one embodiment, the external device is a flash apparatus.

The lens is specifically configured for: determining that a time interval between the effective exposure starting point and the rising edge of the second pulse is greater or less than a time interval between a falling edge of the second pulse and the shutter closing time point.

In one embodiment, the external device is a positioning apparatus.

The lens is specifically configured for: determining that a time interval between the effective exposure starting point and the rising edge of the second pulse is equal to a time interval between a falling edge of the second pulse and the shutter closing time point.

An embodiment of the present application provides a photographing apparatus comprising a body, the body being communicatively connected to an external device and a lens, respectively, wherein the body is configured for:

sending a shutter opening command to the lens;

receiving a trigger signal sent from the lens, the trigger signal comprising a first pulse and a second pulse; and triggering a resetting operation of an image sensor inside the body according to the first pulse and triggering the activation of the external device according to the second pulse.

In one embodiment, the first pulse is prior to the second pulse, and the body is specifically configured for:

in a first working mode, gating the first pulse to the image sensor to trigger the resetting operation of the image sensor; and in a second working mode, gating the second pulse to the external device to trigger the activation of the external device.

The first working mode is switched to the second working mode after the arrival of the first pulse and before the arrival of the second pulse.

In one embodiment, the body is specifically configured for:

in the first working mode, triggering a rising edge of an interrupt when a rising edge of the first pulse arrives; and switching from the first working mode to the second working mode when a falling edge of the interrupt is detected.

In one embodiment, the body comprises a processor and a gating unit, the lens is communicatively connected to the processor and the gating unit, respectively, and the gating unit is communicatively connected to the external device and the image sensor, respectively.

The processor and the gating unit are respectively configured for receiving the trigger signal sent from the lens.

The gating unit is specifically configured for: in the first working mode, gating the first pulse to the image sensor; and in the second working mode, gating the second pulse to the external device.

The processor is specifically configured for: in the first working mode, triggering the rising edge of the interrupt of the processor when the rising edge of the first pulse arrives; and triggering the switching of the gating unit from the first working mode to the second working mode when the falling edge of the interrupt is detected.

In one embodiment, a rising edge of the second pulse arrives after the falling edge of the interrupt.

In one embodiment, the time interval between the rising edge of the first pulse and the rising edge of the second pulse is not less than a first threshold, the first threshold being dependent on a response time required from the triggering of the interrupt to the completion of the switching between the working modes.

An embodiment of the present application further provides a movable platform, comprising: a movable platform body and a photographing apparatus as provided in the above embodiments, wherein the photographing apparatus is mounted on the movable platform body.

The movable platform includes, but is not limited to, a hand-held phone, a hand-held gimbal, an unmanned aerial vehicle, an unmanned vehicle, an unmanned ship, a robot, or an autonomous vehicle.

An embodiment of the present application further provides a movable platform, comprising: a movable platform body and a lens as provided in the above embodiments, wherein the lens is mounted on the movable platform body.

The movable platform includes, but is not limited to, a hand-held phone, a hand-held gimbal, an unmanned aerial vehicle, an unmanned vehicle, an unmanned ship, a robot, or an autonomous vehicle.

An embodiment of the present application further provides a movable platform, comprising: a movable platform body and a photographing apparatus as provided in the above embodiments, wherein the photographing apparatus is mounted on the movable platform body.

The movable platform includes, but is not limited to, a hand-held phone, a hand-held gimbal, an unmanned aerial vehicle, an unmanned vehicle, an unmanned ship, a robot, or an autonomous vehicle.

An embodiment of the present application further provides a readable storage medium, wherein a computer program is stored on the readable storage medium. The control method performed by the photographing apparatus comprising a lens, an external device and a body as described in the above method embodiments is implemented when the computer program is executed.

An embodiment of the present application further provides a readable storage medium, wherein a computer program is stored on the readable storage medium. The control method performed by the photographing apparatus comprising a lens as described in the above method embodiments is implemented when the computer program is executed.

An embodiment of the present application further provides a readable storage medium, wherein a computer program is stored on the readable storage medium. The control method performed by the photographing apparatus comprising a body as described in the above method embodiments is implemented when the computer program is executed.

In the technical solution provided in the embodiment of the present application, two pulse signals are used to control the resetting of the image sensor and the activation of the external device, so that the resetting time point of the image sensor and the activation time point of the external device are independent of each other, and thus the two time points can be separately set to adjust the effective exposure duration and the activation time point of the external device, so as to obtain various photographing effects, or to meet various photographing requirements.

It can be understood by those skilled in the art that all or some of the steps for implementing the above method embodiment may be completed by instructing relevant hardware through a program which may be stored in a computer-readable storage medium, and the steps including those of the above method embodiment are performed when the program is executed. The aforementioned storage medium includes: any medium that can store program codes, such as a read-only memory (ROM), a random-access memory (RAM), a magnetic disk, or an optical disc.

Finally, it should be noted that the above embodiments are merely used for illustrating rather than limiting the technical solutions of the present application. Although the present application has been described in detail with reference to the above various embodiments, those of ordinary skill in the art should understood that the technical solutions specified in the above various embodiments can still be modified, or some or all of the technical features therein can be equivalently substituted; and such modifications or substitutions do not make the essence of the corresponding technical solutions depart from the scope of the technical solutions of the various embodiments of the present application.

What is claimed is:

1. A control method, applied to a photographing apparatus comprising a lens, an external device, and a body communicatively connected to the lens and the external device, the control method comprising:
the body sending a shutter opening command to the lens;
the lens sending a trigger signal to the body according to the shutter opening command, the trigger signal comprising a first pulse and a second pulse;
the body receiving the trigger signal sent from the lens, gating the first pulse to an image sensor to trigger a resetting operation of the image sensor inside the body according to the first pulse, and gating the second pulse to the external device such that the external device receives the second pulse to trigger activation of the external device according to the second pulse.

2. The control method according to claim 1, wherein:
the shutter opening command comprises a shutter duration and an effective exposure duration; and
the lens sending the trigger signal to the body according to the shutter opening command comprises:
the lens determining a shutter opening time point and a shutter closing time point according to the shutter duration;
the lens determining an effective exposure starting point according to the effective exposure duration; and
the lens generating and sending the first pulse between the shutter opening time point and the effective exposure starting point, and generating and sending the second pulse between the effective exposure starting point and the shutter closing time point.

3. The control method according to claim 1, wherein:
the first pulse is prior to the second pulse; and
the body gating the first pulse to the image sensor and gating the second pulse to the external device comprises:
the body, in response to being in a first working mode, gating the first pulse to the image sensor to trigger the resetting operation of the image sensor; and
the body, in response to being in a second working mode, gating the second pulse to the external device to trigger the activation of the external device; and
the body is configured to switch from the first working mode to the second working mode after arrival of the first pulse and before arrival of the second pulse.

4. The control method according to claim 3, wherein the body being switched from the first working mode to the second working mode after the arrival of the first pulse and before the arrival of the second pulse comprises:
in the first working mode, the body triggering a rising edge of an interrupt in response to arrival of a rising edge of the first pulse; and
the body switching from the first working mode to the second working mode in response to detecting a falling edge of the interrupt.

5. The control method according to claim 4, wherein:
the body comprises:
a processor communicatively connected to the lens; and
a gating unit communicatively connected to the processor, the lens, the external device, and the image sensor;
the body receiving the trigger signal sent from the lens comprises the processor and the gating unit receiving the trigger signal sent from the lens;
the body, in response to being in the first working mode, gating the first pulse to the image sensor comprises, in the first working mode, the gating unit gating the first pulse to the image sensor;
the body, in response to being in the second working mode, gating the second pulse to the external device comprises, in the second working mode, the gating unit gating the second pulse to the external device; and
the body being switched from the first working mode to the second working mode after the arrival of the first pulse and before the arrival of the second pulse comprises:
in the first working mode, the processor triggering the rising edge of the interrupt of the processor in response to the arrival of the rising edge of the first pulse; and
the processor triggering the switching of the gating unit from the first working mode to the second working mode in response to the arrival of the falling edge of the interrupt.

6. The control method according to claim 4, wherein a rising edge of the second pulse arrives after the falling edge of the interrupt.

7. The control method according to claim 6, wherein a time interval between the rising edge of the first pulse and the rising edge of the second pulse is not less than a threshold dependent on a response time required from triggering of the interrupt to completion of switching between the first working mode and the second working mode.

8. The control method according to claim 6, wherein the lens is configured to determine the rising edge of the second pulse according to an exposure mode of the photographing apparatus.

9. The control method according to claim 8, wherein:
the exposure mode of the photographing apparatus is a front curtain exposure mode; and
the lens determining the rising edge of the second pulse according to the exposure mode of the photographing apparatus comprises:
the lens determining that a time interval between the effective exposure starting point and the rising edge of the second pulse is less than a time interval between a falling edge of the second pulse and a shutter closing time point.

10. The control method according to claim 8, wherein:
the exposure mode of the photographing apparatus is a rear curtain exposure mode; and
the lens determining the rising edge of the second pulse according to the exposure mode of the photographing apparatus comprises:
the lens determining that a time interval between the effective exposure starting point and the rising edge of the second pulse is greater than a time interval between a falling edge of the second pulse and a shutter closing time point.

11. The control method according to claim 8, wherein:
the exposure mode of the photographing apparatus is a middle exposure mode; and
the lens determining the rising edge of the second pulse according to the exposure mode of the photographing apparatus comprises:
the lens determining that a time interval between the effective exposure starting point and the rising edge of the second pulse is equal to a time interval between a falling edge of the second pulse and a shutter closing time point.

12. The control method according to claim 6, wherein the lens is configured to determine the rising edge of the second pulse according to a type of the external device.

13. The control method according to claim 12, wherein:
the external device includes a flash apparatus; and
the lens determining the rising edge of the second pulse according to the type of the external device comprises:
the lens determining that a time interval between the effective exposure starting point and the rising edge of the second pulse is greater or less than a time interval between a falling edge of the second pulse and a shutter closing time point.

14. The control method according to claim 12, wherein:
the external device includes a positioning apparatus; and
the lens determining the rising edge of the second pulse according to the type of the external device comprises:
the lens determining that a time interval between the effective exposure starting point and the rising edge of the second pulse is equal to a time interval between a falling edge of the second pulse and a shutter closing time point.

15. The control method according to claim 1, further comprising:
the body switching from the second working mode to the first working mode after a shutter closing time point.

16. The control method according to claim 1, further comprising:
the body triggering a rising edge of an interrupt in response to arrival of a rising edge of the first pulse; and
after the arrival of the first pulse and before arrival of the second pulse, in response to detecting a falling edge of the interrupt, the body switching from gating the first pulse to the image sensor to trigger the resetting operation of the image sensor according to the first pulse to gating the second pulse to the external device to trigger the activation of the external device according to the second pulse.

17. A photographing apparatus, comprising:
a lens;
an external device; and
a body communicatively connected to the lens and the external device;
wherein:
the body is configured to send a shutter opening command to the lens;
the lens is configured to send a trigger signal to the body according to the shutter opening command, the trigger signal comprising a first pulse and a second pulse; and
the body is further configured to receive the trigger signal sent from the lens, gate the first pulse to an image sensor to trigger a resetting operation of the image sensor inside the body according to the first pulse, and gate the second pulse to the external device such that the external device receives the second pulse to trigger activation of the external device according to the second pulse.

18. The photographing apparatus according to claim 17, wherein:
the shutter opening command comprises a shutter duration and an effective exposure duration; and
the lens is further configured to:
determine a shutter opening time point and a shutter closing time point according to the shutter duration;
determine an effective exposure starting point according to the effective exposure duration; and
generate and send the first pulse between the shutter opening time point and the effective exposure starting point, and generate and send the second pulse between the effective exposure starting point and the shutter closing time point.

19. The photographing apparatus according to claim 17, wherein:
the first pulse is prior to the second pulse, and the body is further configured to:
in a first working mode, gate the first pulse to the image sensor to trigger the resetting operation of the image sensor; and
in a second working mode, gate the second pulse to the external device to trigger the activation of the external device; and
the first working mode is switched to the second working mode after arrival of the first pulse and before the arrival of the second pulse.

20. A movable platform, comprising:
a movable platform body; and
a photographing apparatus mounted on the movable platform body and comprising:
a lens;
an external device; and
a body communicatively connected to the lens and the external device;
wherein:
the body is configured to send a shutter opening command to the lens;
the lens is configured to send a trigger signal to the body according to the shutter opening command, the trigger signal comprising a first pulse and a second pulse; and
the body is further configured to receive the trigger signal sent from the lens, gate the first pulse to an image sensor to trigger a resetting operation of the image sensor inside the body according to the first pulse, and gate the second pulse to the external device such that the external device receives the second pulse to trigger activation of the external device according to the second pulse.

\* \* \* \* \*